(12) United States Patent
Angwin et al.

(10) Patent No.: US 6,714,865 B2
(45) Date of Patent: Mar. 30, 2004

(54) PROVIDING POSITION INFORMATION TO A DEVICE

(75) Inventors: Alastair J. Angwin, Eastleigh (GB); Brian Innes, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/273,274

(22) Filed: Oct. 17, 2002

(65) Prior Publication Data

US 2003/0120424 A1 Jun. 26, 2003

(30) Foreign Application Priority Data

Dec. 22, 2001 (GB) ............................................. 0130905

(51) Int. Cl.[7] ................................................. H04Q 7/20
(52) U.S. Cl. ........................ 701/213; 455/422; 455/456; 455/556; 370/312; 370/399; 709/224
(58) Field of Search ................................ 701/213, 214, 701/215; 709/224, 225, 242, 220, 228, 222, 328; 455/456, 422, 556, 457, 557; 370/392, 312, 399, 401

(56) References Cited

U.S. PATENT DOCUMENTS 6,377,990 B1 * 4/2002 Slemmer et al. ............ 709/225
6,502,129 B1 * 12/2002 Stewart et al. .............. 709/222
2002/0143930 A1 * 10/2002 Babu et al. .................. 709/224
2002/0164998 A1 * 11/2002 Younis ........................ 455/456
2002/0169897 A1 * 11/2002 Gosalia et al. .............. 709/328
2003/0046383 A1 * 3/2003 Lee et al. .................... 709/224

* cited by examiner

Primary Examiner—Thomas G. Black
Assistant Examiner—Tuan C To
(74) Attorney, Agent, or Firm—Jerry W. Herndon

(57) ABSTRACT

A system for providing position data in a pre-determined format to a device (e.g. a smartphone, laptop etc.), whereby the device is capable of executing an application. The system utilizes a plurality of position determination systems (e.g. GPS), which provide position data. The system further comprises an application program interface (API), which receives a request for position data from the application and passes this request to one of a plurality of position adapters. Each position adapter receives position data from a respective position determination system. The system further comprises an interface program providing data handling functions. The interface program determines whether the received position data is in a pre-determined format preferred by the application and if it is not, the respective position adapter creates position data in a pre-determined format.

31 Claims, 4 Drawing Sheets

PROVIDING POSITION INFORMATION TO A DEVICE

FIELD OF THE INVENTION

The present invention relates to telecommunications systems and more particularly to providing position information to a device.

BACKGROUND OF THE INVENTION

Position determination systems offer a method of providing a geographic position relative to other people or objects, whether moving or stationary. The number of these systems is increasing and they fall into two broad categories, namely, stand-alone and remote.

Remote systems require an external source in order to determine location. Services include electronic navigational fixed beacons, such as Long Range Electronic Navigation (LORAN). The beacons repetitively transmit signals and a device determines its own location by determining a beacon ID and determining its distance from the beacon.

Another example of a remote system is network-based triangulation. Examples of triangulation techniques include a radio cell. Typically, a plurality of cell stations communicate via a network and a plurality of devices (personal stations) are free to move amongst radio cells, whereby each cell station has a radio cell. The radio cell defines a territory within which a device can communicate with a cell station via a radio link and each of the cells comprises a unique cell number. A device will typically have knowledge of a cell number but is unlikely to know the longitude and latitude data from this information. Therefore, a network server typically utilises the cell number information and associates the number with a radio cell. The server then associates the cell with a geographic position. This technique is relatively inaccurate and also performs poorly in built up areas. The implementation is typically server based, otherwise all applications running on the devices would need to be able to relate a cell number to a position—this would be a processing overhead.

Another example is a radio cell segment, whereby a cell is broken into several segments, e.g. a 90-degree segment. This technique is more accurate than the radio cell and is again server based to be useful, otherwise all applications running on devices would need to be able to relate a cell/segment number to a position. A further improvement is a radio cell with distance estimation whereby, distance estimation occurs by utilising signal strength or transmission latency. This technique can be combined with the radio cell techniques described above, to increase the accuracy of results. Typically, signal strength can be measured on the device itself or via a network base station. Generally, distance estimates can only realistically be made in the network and therefore, this technique is typically server based.

A triangulation technique, such as satellite triangulation, calculates a device's spatial relationship to the satellites, in order to determine the position. As shown in FIG. 1A, the reading (100) from one satellite will narrow the area to be searched significantly. In FIG. 1B, utilising readings from two satellites, narrows the field of search to the area (105) where the readings intersect. Finally in FIG. 1C, by utilising a third satellite, a device's position is placed at one point (110). Typically, this technique is again server based.

Stand-alone systems can provide location information in the required format (longitude, latitude and error) without having to communicate with an external source. An example is a device-based triangulation system, such as, the Global Positioning System (GPS). GPS comprises a multitude of satellites orbiting approximately 11,000 miles above the earth's surface, which are used to enable the position of a compatible receiver to be located relative to the earth. There are eight orbiting satellites in each of three sets of orbits giving twenty-four satellites in total. The longitude, latitude and altitude of any point close to earth, with respect to the centre of the earth, are calculated by determining the propagation time of signals from at least four of the satellites to the point.

Referring to FIG. 2, there is shown a partially schematic pictorial view of a global positioning system (202). As illustrated, a computer (204) may be located, for example, in Greenock, Scotland. Also depicted within the global system (202) is a plurality of terrestrial satellites (206). The satellite network comprises a plurality of satellites (206) that may be implemented utilising several combinations of satellite systems. For example, the Global Positioning Satellite (GPS) system may be utilised. Generally, although GPS is essentially a device-based technique (the device being the GPS receiver), to provide more accuracy, a server could also be utilised in order to determine position. The details of a global positioning system are believed to be within the ambit of those having ordinary skill in this art and thus, the details of such a system form no part of this specification.

Another example of a stand-alone system is a technology that pre-configures a fixed location for a device. An example of such a device is an information point kiosk, which is configured on installation with its location.

An additional system for determining position involves asking the user of a device, either for a position or for landmarks (e.g. street names, routes, buildings, etc.). This system is clearly not automatic/immediate but in some situations (where all else fails), by prompting the user for input, a position determination system can begin to try and determine a position. Another technique, "dead reckoning" tracks a user when he/she passes sensing positions on a particular route for a period of time. An estimated position can be established by extrapolation, the real position being updated and subsequent estimates improved when the next sensing position is passed.

NMEA-0183 (National Marine Electronics Association) is an interface standard for transmitting navigation information (including GPS). The characters utilised in the standard are in ASCII text and the data transmitted between devices occurs in a "sentence" format. The standard allows proprietary sentence formats to be set and therefore, users of devices will encounter the problem of having to subscribe to proprietary solutions.

With the increasing use of mobile devices, the number of location based services is on the increase. Location based services are a set of applications that utilise a geographic position associated with a mobile device. Depending on a user's geographic position, different location based services are provided to a user.

Location based services utilise stored user profiles. The user profiles could be stored within a home location register for a cellular telecommunication system. Stored within each user profile is a plurality of service profiles associated with that user, whereby each of the plurality of service profiles is defined for a zone location. Real-life applications of location based services include safety purposes, such as roadside assistance; billing purposes, such as location sensitive billing; information purposes, such as traffic, navigation or news information and tracking purposes, such as fleet management.

Currently, prior art solutions for providing position information offer no method of structuring the various types of position information provided by position determination systems. Furthermore, a problem with current position determination systems is that they are all server based. Therefore, a client application is unable to access position information without accessing an external server of a proprietary solution. Even when using GPS, whereby a position is obtained via a GPS receiver on the device, there is no method of accessing any proprietary system and furthermore, GPS receivers are costly.

Therefore, there is a need for a user to know his/her current position without having to subscribe to or purchase proprietary solutions. There is a need for a technique whereby an application running on a device (such as a route finder application) can determine the device's position by using a familiar co-ordinate system, irrespective of the technology providing the position information. More specifically, there is a need for a client side service that is available for applications such as browser services.

SUMMARY OF THE INVENTION

According to a first aspect, the present invention provides a system (310) for providing position data in a predetermined format to a device (300), in which said device comprises means for executing an application (305), for use with a plurality of position determination systems (315, 320), each of said plurality of position determination systems providing position data, said system further comprising: means for providing an interface (400) to said application, whereby said means for providing an interface (400) receives a request for position data from said application; one or more means for receiving (415) position data from respective position determination systems; and means for providing data handling (405); in which said means for providing data handling (405) determines whether said received position data is in a pre-determined format; and said means for receiving (415), responsive to an unsuccessful determination, creates position data in a pre-determined format. Beneficially, the type of device and the type of position determination system does not matter. Therefore, the present invention allows different position determination systems, which provide varying position information, to utilise a standard architecture.

In a preferred embodiment, the system further comprises means for supporting the receiving means, whereby the application's request for position data is passed via the means for supporting to the means for receiving. Preferably, if the received position data is not in a pre-determined format, the means for providing an interface provides the created position data (which is in a pre-determined format) to the application and if the received position data is in a pre-determined format, the means for providing an interface provides the received position data (which is already in a pre-determined format) to the application. More preferably, the means for receiving utilises an associated application to create position data in a pre-determined format.

Note, that although each of the plurality of position determination systems provides differing position data, the application can beneficially obtain position data from any of the systems. Aptly, at least one of the plurality of position determination systems is a global positioning system; a plurality of cell stations and personal stations, communicating over a network; or a pay service. More aptly, the system further comprises means for controlling the plurality of position determination systems, for example, hardware or software security controls preventing other users from gaining access to the position information of the device.

Preferably, the position data is provided to the application with associated values for latitude, longitude and altitude and if the user requires it, associated values for accuracy. To aid with accuracy, in a preferred embodiment, the plurality of position determination systems comprises an exclusion list, whereby the list comprises co-ordinates associated with position data. The position data in the list is either inaccurate or not relevant. For example, in an exclusion list for the United Kingdom, it may not necessary to hold information about excluded areas in the United States of America.

According to a second aspect, the present invention provides a method of providing position data in a pre-determined format to a device (300), in which said device comprises means for executing an application (305), for use with a plurality of position determination systems (315, 320), each of said plurality of position determination systems providing position data, in a system comprising: means for providing an interface (400) to said application, whereby said means for providing an interface (400) receives a request for position data from said application; one or more means for receiving (415) position data from respective position determination systems; and means for providing data handling (405); said method further comprising the steps of: determining, by said means for providing data handling (405), whether said received position data is in a pre-determined format; and in response to an unsuccessful determination, creating, by said means for receiving (415), position data in a pre-determined format.

According to a third aspect, the present invention provides a computer program product for providing position data in a pre-determined format to a device, in which said device comprises means for executing an application (305), for use with a plurality of position determination systems (315, 320), each of said plurality of position determination systems providing position data, running in a system, said system comprising means for providing an interface (400) to said application, whereby said means for providing an interface (400) receives a request for position data from said application; one or more means for receiving (415) position data from respective position determination systems; and means for providing data handling (405); said computer program product being stored on a computer readable storage medium and comprising instructions which when executed in said system, carry out the steps of: determining, by said means for providing data handling (405), whether said received position data is in a pre-determined format; and in response to an unsuccessful determination, creating, by said means for receiving (415), position data in a pre-determined format.

BRIEF DESCRIPTION OF THE DRAWINGS

The present invention will now be described, by way of example only, with reference to preferred embodiments thereof, as illustrated in the following drawings.

DETAILED DESCRIPTION OF THE PREFERRED EMBODIMENTS

Figure 1A:
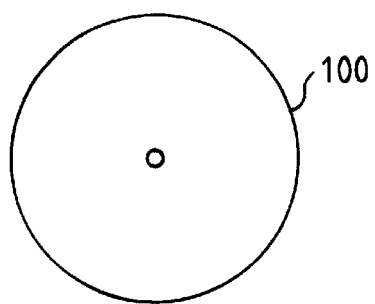
FIGS. 1A–1C show the basics of the triangulation technique.
Figure 1B:
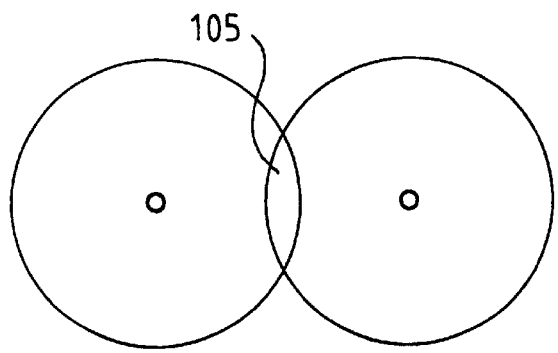
Figure 1C:
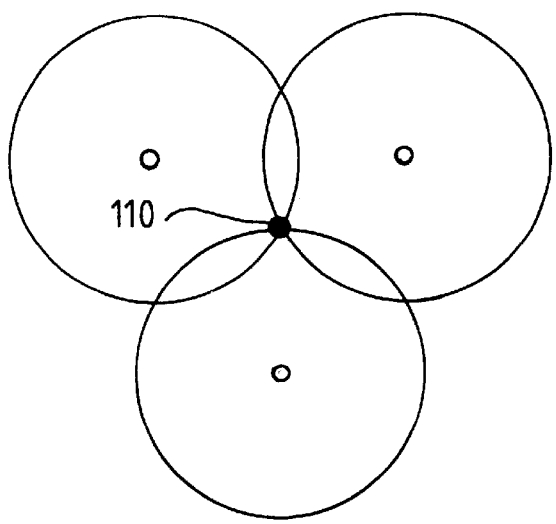
Figure 2:
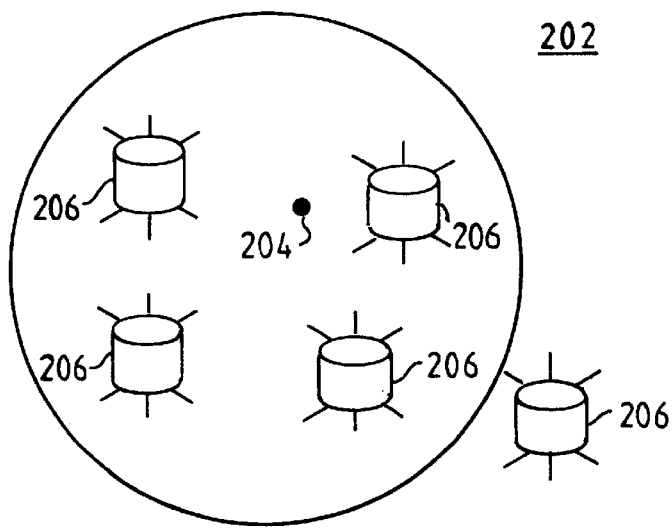
FIG. 2 shows a partially schematic pictorial view of a global positioning system.
Figure 3:
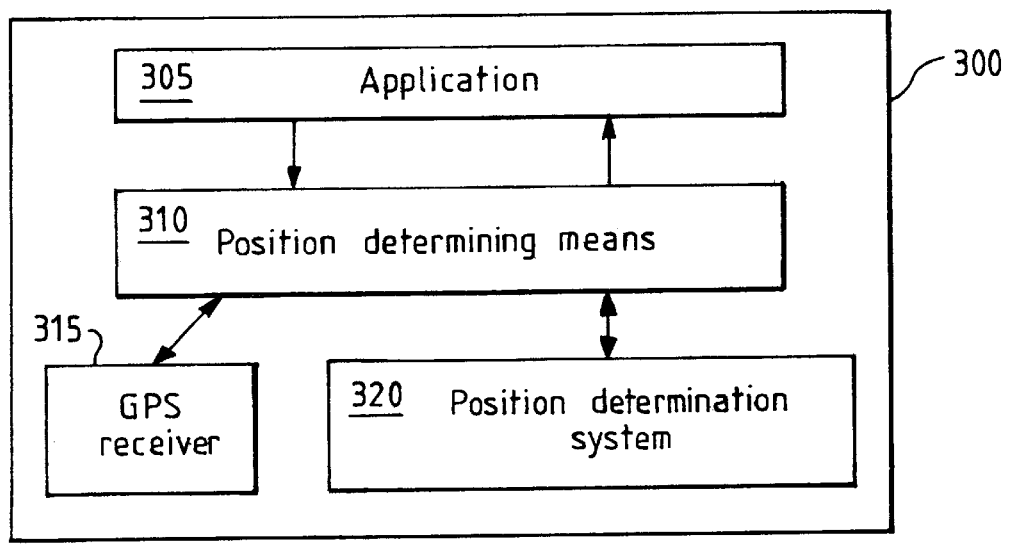
FIG. 3 shows an overview of a client device, according to the present invention.

FIG. 3 shows a representation of a device according to the present invention. For example, the device (300) is a "smartphone", which is typically a portable phone comprising extra computing functions, such as, the Wireless Access Protocol (WAP) for accessing the Internet. In FIG. 3, an application (305) running on the device (300), such as a route finder application, is shown. Preferably, the application (305) interacts with position determining means (310) of the present invention—this will be described in more detail with reference to FIG. 4. Also shown, is a GPS receiver (315) (a position determination system), and a further position determination system (320) is also shown. It should be understood that the present invention allows one or more position determination systems to be utilized. If two or more position determination systems are utilized, whereby each system provides differing position data. Beneficially, the present invention provides a mechanism to standardize the differing position data.

An example of a position determination system (320) is a pay service, whereby a user can telephone a third party service (often at a premium rate) and ask for their current position. For example, if a user contacts the third party service and gives his/her location (e.g. Hursley Road, Winchester), the third party service can provide the user with co-ordinates for Hursley Road. An example of an offering that takes this service further, is provided by Vizzavi (http://www.vizzavi.co.uk), which identifies a user's position and can then provide location based services to the user's mobile phone (e.g. the nearest restaurant or bar to that user). A further example of a position determination system (320) is a simple radio cell, as described above.

Figure 4:
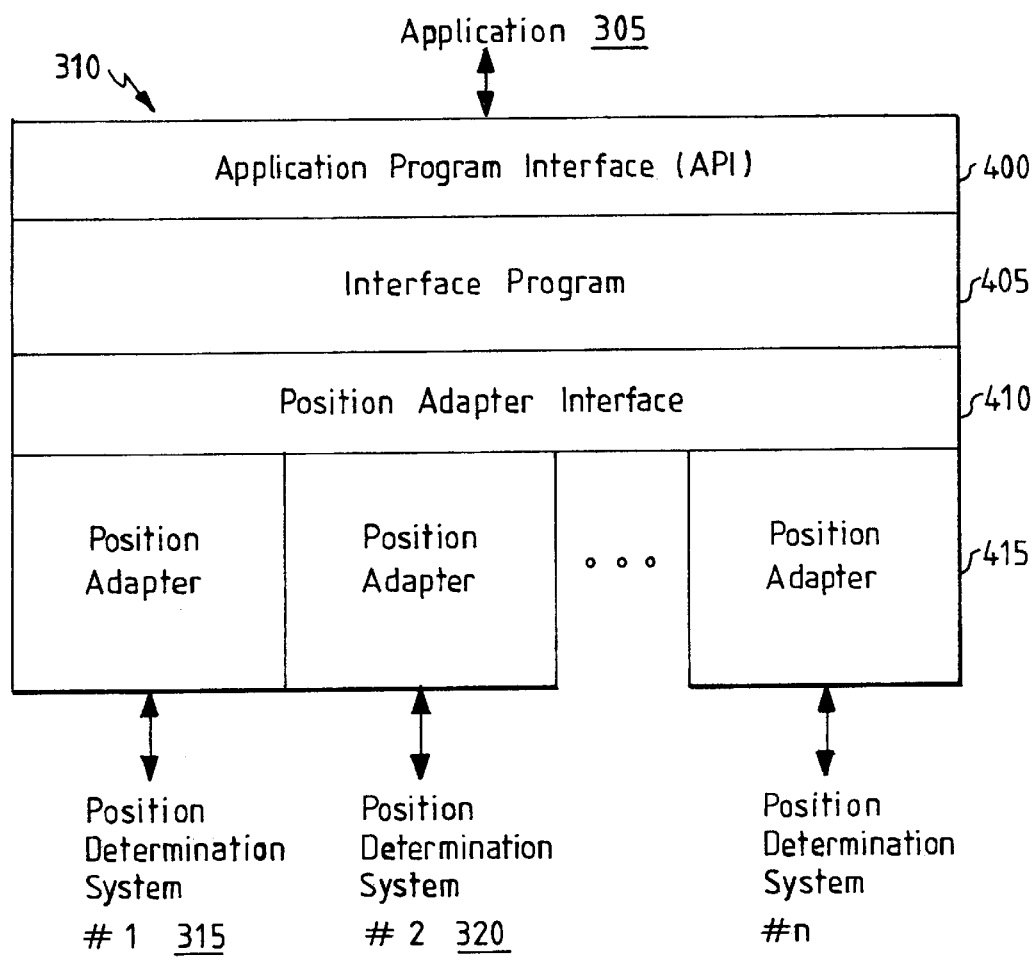
FIG. 4 shows a detailed overview of a position determining means, according to the present invention.

FIG. 4 shows a detailed overview of position determining means (310) of the present invention. Generally, the present invention provides an application-level service for applications running on a device. Advantageously, by utilising the present invention, a device (300) can obtain position information, irrespective of the technology or services providing the position information.

The Application Program Interface (API) (400) provides a common interface to the application (305). Preferably, the API is developed in application development languages (e.g. Java (Java is a trademark of Sun Microsystems, Inc.)) supported by the device (300).

Preferably, to support the Internet environment, an appropriate "control" (whereby a "control" is a means for accessing information while also controlling the information that will be received) is also provided to allow Internet-based services to take advantage of the position information. For example, HTML, XML, or JavaScript (JavaScript is a trademark of Sun Microsystems, Inc.) and Java classes provided by current browser environments can be utilized. Therefore, by utilizing HTML etc., a means to access information and to specify how an application can use that information is provided.

Advantageously, by providing position information to Internet-based applications via means such as HTML, technologies such as Wireless Application Protocol (WAP) or NTT DoCoMo's "i-Mode" (i-mode is a registered trademark of NTT DoCoMo)—a successful wireless service offering Internet facilities via a mobile phone—are able to use a consistent mechanism. In an Internet environment, preferably, the API (400) is accessible to a "Script based" application running in a browser. Preferably, the API is available directly by an application via a call etc. For example, one possible implementation utilises an "XML" application, which supports variables, together with an HTTP URL to obtain the location function. For example, the address "location://CurrentPosition" (analogous to http://www.ibm.com in a browser environment, for example) would utilise HTTP to resolve the data associated with "CurrentPosition". Once resolved, data (e.g. position information in latitude and longitude co-ordinates, accuracy etc.) is passed back (analogous to passing back the HTML page for www.ibm.com in a browser environment, for example).

In FIG. 4, an interface program (405) is also shown. The function of the interface program (405) is to provide the data handling features of the API interface, whereby data is being passed between the application (305) and the position adapters (415). Preferably, the interface program (405) carries out functions such as applying position determining selection rules, based on cost; accuracy; availability, etc. Additionally, the interface program (405) preferably verifies data from the position determination systems (320), for example, by checking whether the data is parameterised correctly.

The interface program (405) also preferably provides the appropriate calls to the position adapter interface (410) for the incoming position requests from the application (305). Additionally, the interface program (405) preferably interrogates the position adapters (415), to obtain data regarding the level of accuracy required, associated costs etc. The interface program (405) can then utilise this data to determine the most appropriate service to be provided to the application (305), via the position adapter interface (410). The interface program (405) also provides a set-up interface for decision logic. Preferably, this function is implemented through either the API (400) or through some other management interface (not shown in FIG. 4).

Referring to FIG. 4, there is also shown a position adapter interface (410), according to the present invention, which provides a "plug-in" mechanism for a position adapter (415). That is, a common interface is provided for a variety of position adapters, so that the present invention can support position information from a variety of sources.

The function of a position adapter (415) is to receive incoming position information from the position determination systems (315, 320) and convert the information into a standard format. This standardised position information is then provided to the position adapter interface (410). For example, in the case where the device (300) comprises a GPS receiver (315) (position determination system #1 in FIG. 4), the incoming position information will be in a format which is close to that of the preferred embodiment of the present invention, namely, "MyCurrentPosition( )". Therefore, the position adapter (415) does not have to carry out much processing to standardise the GPS position information. However, if the GPS position information does not comprise optional parameters required by an application (305), such as an accuracy indication, the position adapter (415) will preferably carry out some processing to obtain this. For example, if the GPS receiver (315) is utilising a network server, the position adapter (415) will preferably query this network server to find data associated with the accuracy indication. In this case, one example of a position adapter (415) is a serial port driver with an associated application to reformat and translate the position information.

In the case where the device (300) utilises a different position determination system (320) (#2 in FIG. 4), the associated position adapter (415) may have to carry out more processing. If the position determination system (320)

is a pay service, the position adapter (415) will carry out some processing to find the appropriate trusted network server of the third party and request the device's current position information from the server. Once the information is received, the position adapter (415) can utilise an associated application to standardise this received information, so that the application (305) can use it.

In the case where the device (300) utilises a simple position determination system (#n in FIG. 4), such as a radio cell, the position adapter (415) will have to carry out much more processing in order to obtain position information of a standardised format. For example, the position adapter (415) may even have to utilise remote services. In this case, the position adapter (415) may obtain position information by retrieving cell information and a list of base stations that can be heard. Next the position adapter (415) retrieves associated signal strengths. The position adapter (415) then preferably sends all the data via an available communication means, for example, via the WAP protocol, to a server. The server then does some processing to determine position information, as described before, with reference to radio cells. Finally, as described above, the position adapter (415) can utilise an associated application to standardise this received information, so that the application (305) can use it.

Preferably, the API (400) will provide an application (305) with a position, in terms of latitude and longitude co-ordinates and also a distance, in terms of an estimate of error offset. This is calculated by combining information from all position determination systems (320), such as GPS, that supply position information of a device. For example, where a reading "A" and a reading "B" from two different position determination systems (320) is available, by combining the readings "A" and "B", a more accurate position "C" with a smaller error is deduced.

In a preferred implementation, the position information is sent to the user as "MyCurrentPosition( )", with parameters of longitude, latitude and distance as comma separated values. Preferably, because different position determination systems provide varying levels of accuracy, an indication of accuracy (optional parameter) is provided with the position information—e.g. low, medium, high, best effort etc. If a user is utilising a position determination system (320) that is a pay service, then the level of accuracy provided by the third party can be made to depend on the amount of money a user is willing to pay. For example, at a lower cost, low accuracy could be provided and if a user requires a precise location and therefore a high degree of accuracy, this can be provided, but at a higher cost.

Figure 5:
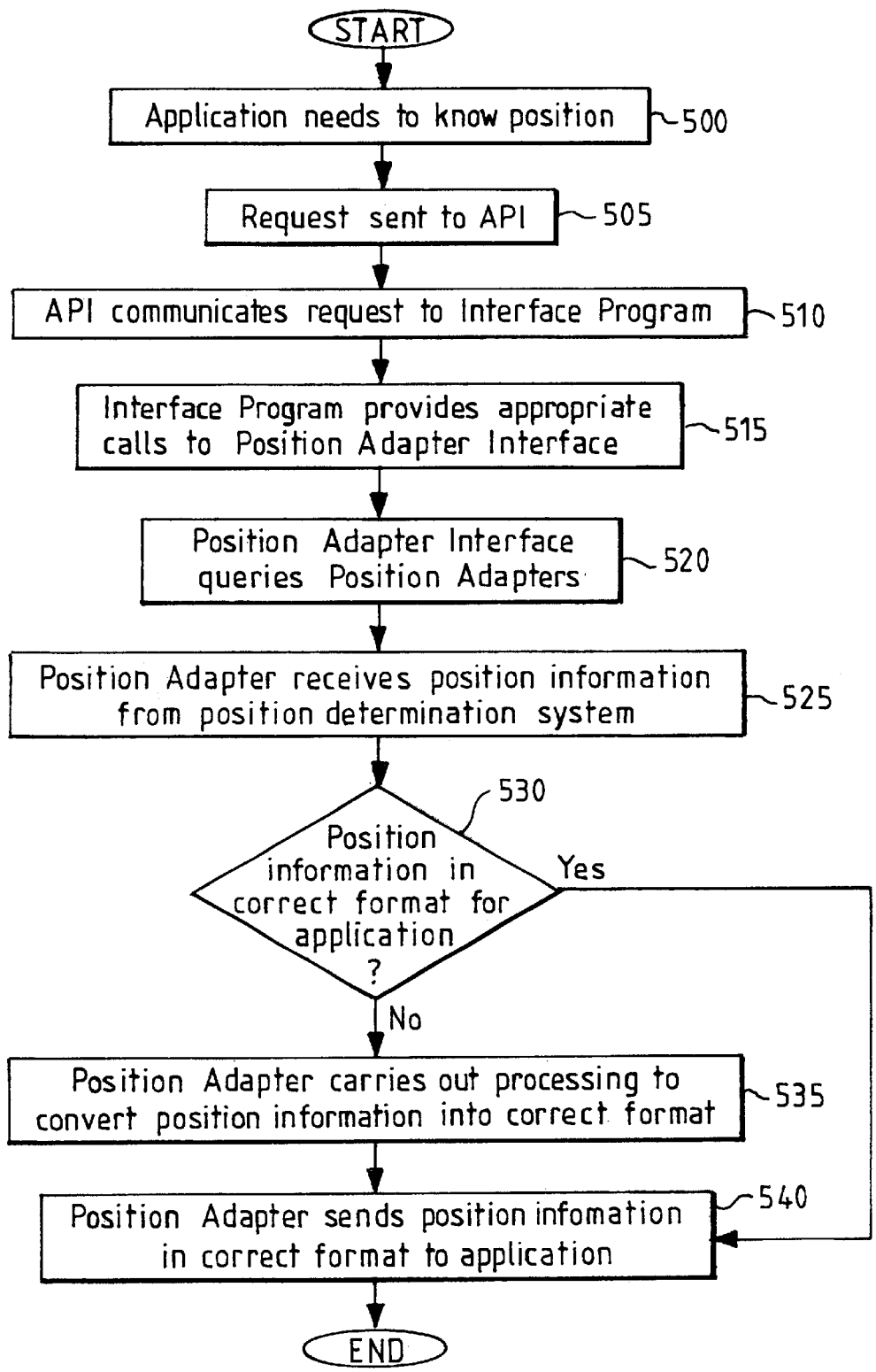
FIG. 5 is a flow chart showing the operational steps involved, according to the present invention.

Referring to FIG. 5, a flow chart describing the operational steps involved in the present invention is described. Firstly, an application (305), such as a route finder application, requests (step 500) a position. This request (in the format of a message for example) is then passed to the position determining means (310). More specifically, the request is sent (step 505) to the API (400). The request is then passed via the interface program (405) at step 510, to the position adapter interface (410) at step 515. The position adapter interface (410) is responsible for querying (step 520) the position adapters (415) for a position of the device (300). The position adapters (415) receive (step 525) position information from position determination systems (320), such as a GPS receiver (315).

Preferably, the incoming position information is verified (step 530) to check whether it is in the correct format for the application (305). In the preferred embodiment, the interface program (405) is responsible for this verification step. If it is determined that the incoming information is in the correct format for the application (305) (positive result at step 530), then the information is sent (step 540) to the application (305) to utilise. If it is determined that the incoming information is not in the correct format for the application (305) (negative result at step 530), because it is lacking an accuracy indication for example, then the relevant position adapter (415) carries out some processing (step 535). For example, the position adapter (415) may have to standardise the incoming information or provide any extra parameters required (such as the accuracy). Once the information is in the correct format, the information is sent (step 540) to the application (305) to utilise.

It should be understood that the position determination systems vary immensely. Some examples are: a GPS receiver through a serial port; cell information on the device itself; an application utilising complex operations involving network requests, or a combination of local information (on the device) and network based requests. Preferably, the Internet is the primary delivery channel for these position determination systems. Preferably, the position determination systems provide position information in the form of latitude and longitude co-ordinates.

It should be understood that in some areas, a specific position determination system may not be able to provide accurate readings, however it may still provide readings. For example, in the case where GPS is implemented, in a built-up area, signals reflected off buildings can result in false/inaccurate positions being generated. To solve this problem, an exclusion list can be associated with a position determination system provider. The exclusion list stores co-ordinates of areas or zones. Readings generated within one of these areas or zones by a position determination system provider, are highlighted as being erroneous. The exclusion list can be updated dynamically from a source defined by the position determination system provider, such as a known URL, to prevent large amounts of data having to be stored. For example, in an exclusion list for the United Kingdom, it may not necessary to hold information about excluded areas in the United States of America.

Preferably, the present invention utilises "controls" (in the preferred embodiment, the controls are software based, but the present invention could also be implemented with a hardware interface) at a device level to allow the user to manage the behaviour of a position determination system. For example, the user may "enable" the position determination system, "disable" the position determination system or "request" that user permission is sought each time an application (305) requests a position.

In addition to the device level controls, a Web browser utilised in accordance with the present invention, will also comprise controls. Examples of Web browser controls that could be implemented include currently available controls, such as, security options. The current security options could allow the user to manage access levels to position information. Preferably, the security options ensure that issues relating to privacy are addressed, by allowing a user to control who or what has access to the position information of his/her device.

Other controls that may be incorporated include:
- Allowing a specific URL (Universal Resource Locator)/domain to access position information
- Allowing only trusted sites to access the position information
- Enable/Disable the Java/JavaScript interface It will be apparent from the above description that, by using the techniques of the preferred embodiment, an API is provided, allowing access to current position information for an application running on a device. Beneficially, the type of device does not matter, e.g. the device could be a laptop, Personal Digital Assistant (PDA), Smartphone, set-top box etc.

According to the present invention, the execution of an API call would result in a position being provided to the application. Advantageously, the type of position determination system does not matter, e.g. the position determination system could utilise an internal GPS receiver; request (over an available network) the position information from a service that knows the position e.g. one using triangulation techniques or dead-reckoning etc. Therefore, the present invention allows different position determination systems, which provide varying position information, to utilise a standard architecture.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

Although the present invention and its advantages have been described in detail, it should be understood that various changes, substitutions and alterations can be made herein without departing from the spirit and scope of the invention as defined by the appended claims.

What is claimed is:

1. A system (310) for providing position data in a pre-determined format to a device (300), in which said device comprises means for executing an application (305), for use with a plurality of position determination systems (315, 320), each of said plurality of position determination systems providing position data, said system further comprising:
means for providing an interface (400) to said application, whereby said means for providing an interface (400) receives a request for position data from said application;
one or more means for receiving (415) position data from respective position determination systems; and
means for providing data handling (405);
in which said means for providing data handling (405) determines whether said received position data is in a pre-determined format; and said means for receiving (415), responsive to an unsuccessful determination, creates position data in a pre-determined format.

2. A system as claimed in claim 1, further comprising means for supporting (410) said receiving means (415).

3. A system as claimed in claim 2, in which said request is passed via said means for supporting (410) to said means for receiving (415).

4. A system as claimed in claim 1, in which in response to an unsuccessful determination, said means for providing an interface (400) provides said created position data in a pre-determined format to said application.

5. A system as claimed in claim 1, in which in response to a successful determination, said means for providing an interface (400) provides said received position data in a pre-determined format to said application.

6. A system as claimed in claim 1, in which each of said plurality of position determination systems provides differing position data.

7. A system as claimed in claim 1, in which at least one of said plurality of position determination systems is a global positioning system.

8. A system as claimed in claim 1, in which at least one of said plurality of position determination systems comprises a plurality of cell stations and personal stations, communicating over a network.

9. A system as claimed in claim 1, in which at least one of said plurality of position determination systems comprises a pay service.

10. A system as claimed in claim 1, in which said system further comprises means for controlling said plurality of position determination systems.

11. A system as claimed in claim 10, in which said means for controlling comprises security functions for controlling access to said device.

12. A system as claimed in claim 1, in which said position data is provided to said application with associated values for latitude, longitude and altitude.

13. A system as claimed in claim 12, in which said position data further comprises associated values for accuracy.

14. A system as claimed in claim 1, in which said means for receiving (415), utilizes an associated application to create position data in a pre-determined format.

15. A system as claimed in claim 1, in which at least one of said plurality of position determination systems comprises an exclusion list, whereby said list comprises co-ordinates and position data known to be inaccurate.

16. A method of providing position data in a pre-determined format to a device (300), in which said device comprises means for executing an application (305), for use with a plurality of position determination systems (315, 320), each of said plurality of position determination systems providing position data, in a system comprising: means for providing an interface (400) to said application, whereby said means for providing an interface (400) receives a request for position data from said application; one or more means for receiving (415) position data from respective position determination systems; and means for providing data handling (405); said method further comprising the steps of:
determining, by said means for providing data handling (405), whether said received position data is in a pre-determined format; and
in response to an unsuccessful determination, creating, by said means for receiving (415), position data in a pre-determined format.

17. A method as claimed in claim 16, further comprising supporting, by means for supporting (410), said receiving means (415).

18. A method as claimed in claim 17, in which said request is passed via said means for supporting (410) to said means for receiving (415).

19. A method as claimed in claim 16, in which in response to an unsuccessful determination, providing, by said means for providing an interface (400), said created position data in a pre-determined format to said application.

20. A method as claimed in claim 16, in which in response to a successful determination, providing, by said means for providing an interface (400), said received position data in a pre-determined format to said application.

21. A method as claimed in claim 16, in which each of said plurality of position determination systems provides differing position data.

22. A method as claimed in claim 16, in which at least one of said plurality of position determination systems is a global positioning system.

23. A method as claimed in claim 16, in which at least one of said plurality of position determination systems comprises a plurality of cell stations and personal stations, communicating over a network.

24. A method as claimed in claim 16, in which at least one of said plurality of position determination systems comprises a pay service.

25. A method as claimed in claim 16, further comprising the step of: controlling said plurality of position determination systems.

26. A method as claimed in claim 25, in which said controlling step further comprises the step of utilizing security functions for controlling access to said device.

27. A method as claimed in claim 16, in which said position data is provided to said application with associated values for latitude, longitude and altitude.

28. A method as claimed in claim 27, in which said position data further comprises associated values for accuracy.

29. A method as claimed in claim 16, further comprising the step of: utilizing, by said means for receiving (415), an associated application to create position data in a pre-determined format.

30. A method as claimed in claim 16, in which at least one of said plurality of position determination systems comprises an exclusion list, whereby said list comprises co-ordinates and position data known to be inaccurate.

31. A computer program product stored on a computer readable storage medium for, when run on a computer, instructing the computer to carry out the method of claim 16.

* * * * *